June 8, 1937.  J. A. MORAN  2,083,082
DOUGHNUT MACHINE
Filed Feb. 21, 1936  3 Sheets-Sheet 1
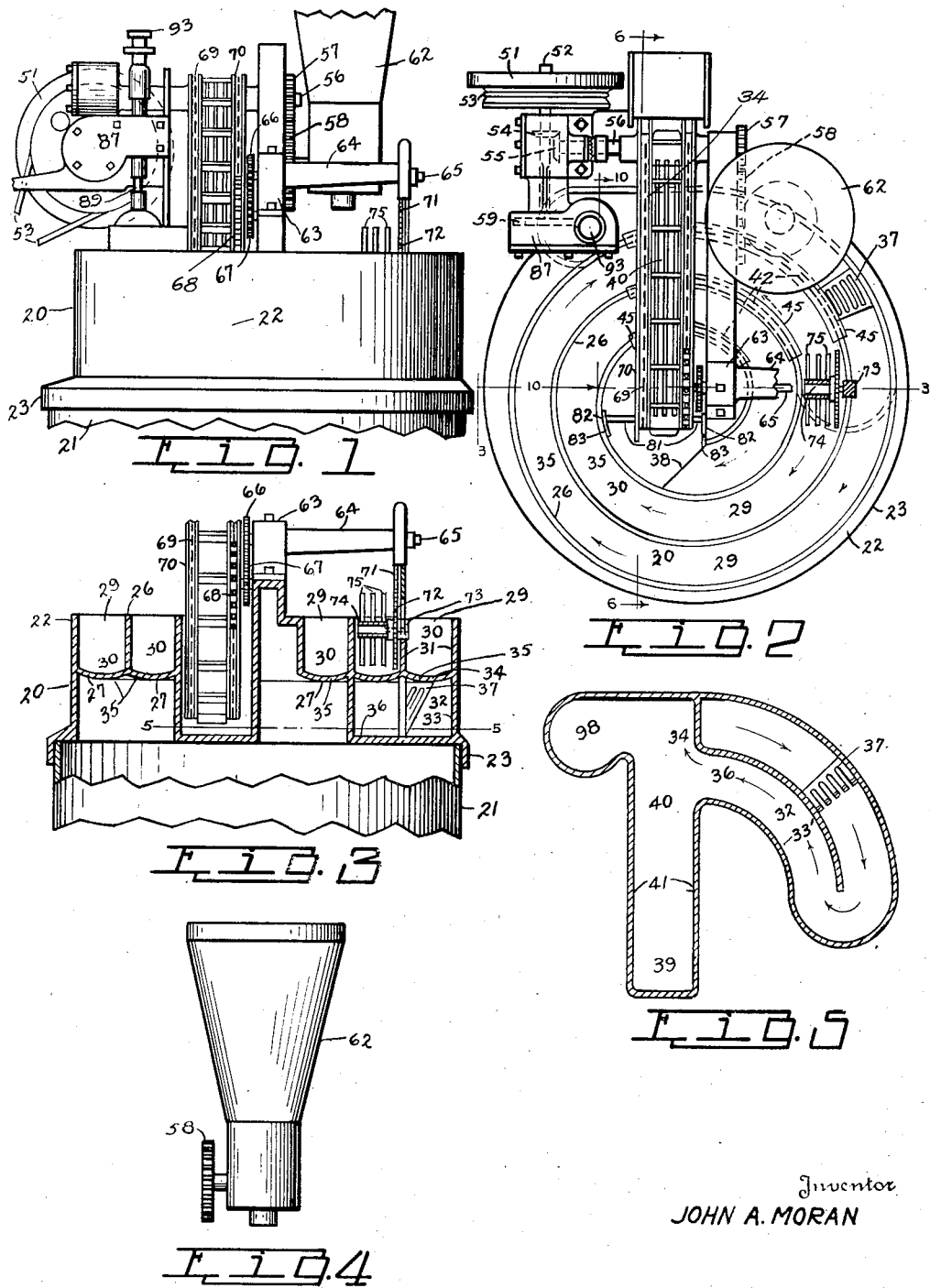
Inventor
JOHN A. MORAN
J. B. Dickman, Jr.
Attorney

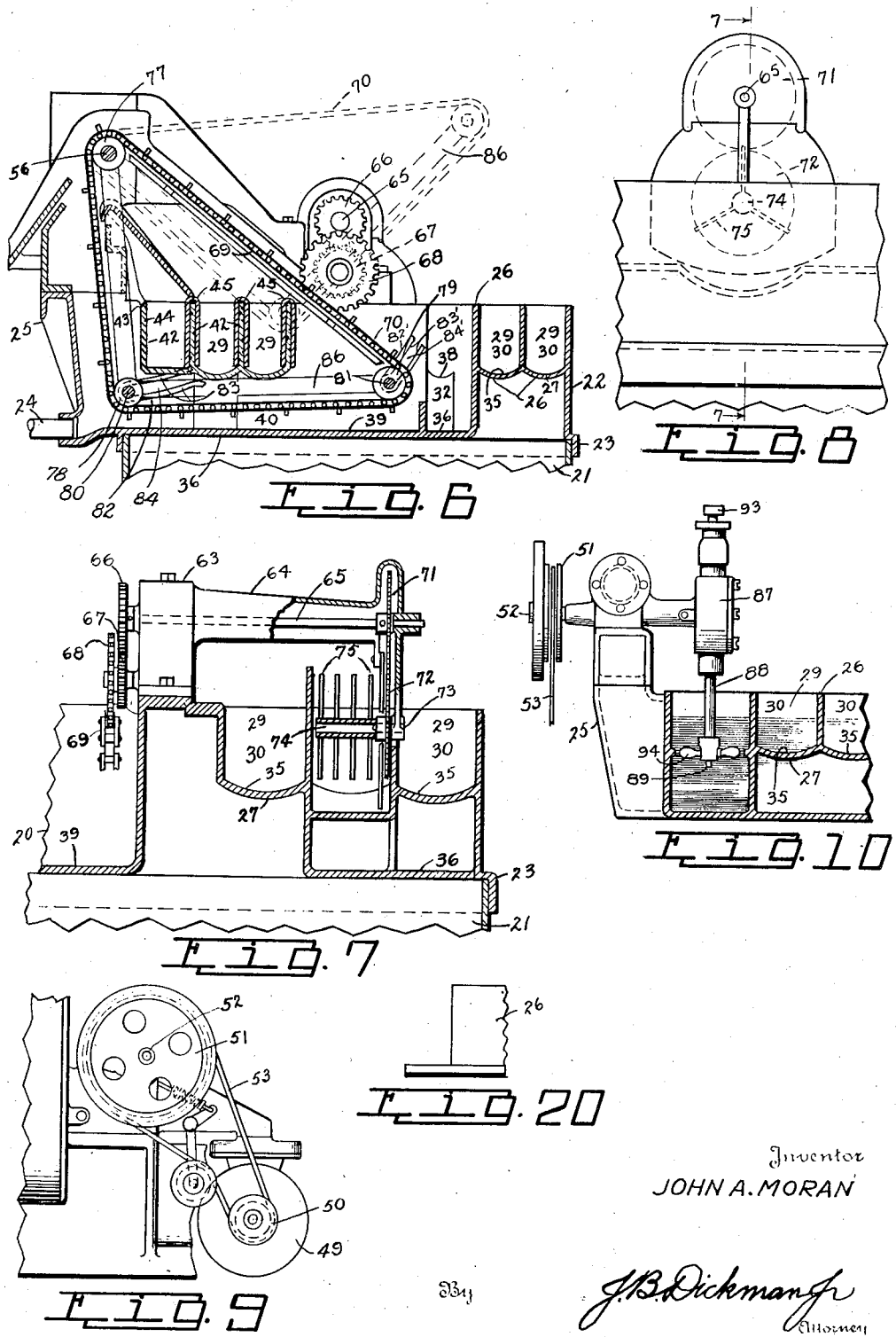

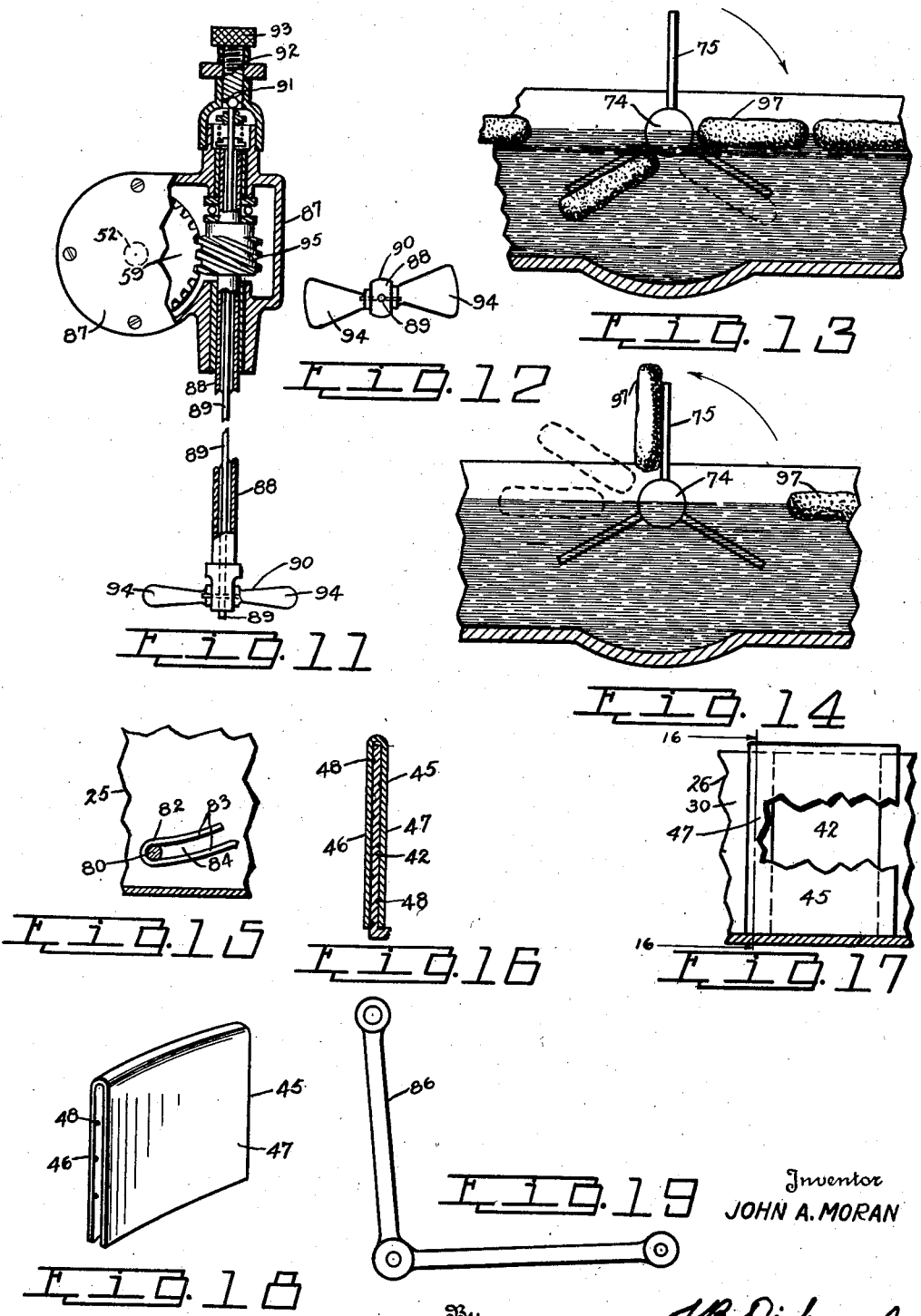

Patented June 8, 1937

2,083,082

UNITED STATES PATENT OFFICE 2,083,082

DOUGHNUT MACHINE

John A. Moran, Brashear, Mo.

Application February 21, 1936, Serial No. 65,160

17 Claims. (Cl. 53—7)

The present invention relates to improvements in food cookers, and particularly to that class of cookers for forming and frying or cooking doughnuts and the like.

It is an object of the present invention to provide means for the continuous flow of cooking or frying oil and for controlling the flow of said oil.

Another object of the present invention is the provision of means for continuous circulation of the cooking oil in the machine in a circuitous manner.

A still further object of the present invention is the provision of means for preventing damage to the moulded uncooked doughnut.

A still further object of the present invention is the provision of a conveyor that may be elevated and disengaged from the frying trough.

A still further object of the present invention is the provision of removable sections of the channel.

A still further object of the present invention is the provision of locking means for the removable channel sections.

A still further object of the present invention is the provision of novel means for operatively connecting the mechanism.

A still further object of the present invention is the provision of novel and improved means for turning the doughnuts over in the oil.

With these and other objects in view the present invention consists in the novel details of construction and arrangement of parts described and claimed in the following specification, and illustrated in the accompanying drawings, and while I have illustrated and described preferred embodiments of my invention, I would have it understood that changes may be made in details without departing from the spirit or scope of the claims hereto appended.

Figure 1 is a front elevational view of my improved dough-nut machine.

Figure 2 is a top plan view thereof.

Figure 3 is a vertical sectional view of same taken on line 3—3 of Figure 2, portions being shown fragmentarily.

Figure 4 is an elevational view per se of a conventional type of dough-hopper and cutter.

Figure 5 is a horizontal sectional view of the lower portion of my improved dough-nut machine taken on line 5—5 of Figure 3.

Figure 6 is a vertical sectional view of certain parts of the structure of my improved dough-nut machine taken on line 6—6 of Figure 2, and illustrating in dotted lines the conveyor disengaged from the tank and in raised position and means for holding the operative shape of the conveyor while elevated, portions being shown fragmentarily.

Figure 7 is a vertical sectional view of certain parts of my improved dough-nut machine taken on line 7—7 of Figure 8, or on line 3—3 of Figure 2, parts being illustrated fragmentarily.

Figure 8 is a fragmentary view of a portion of my improved dough-nut machine looking toward the right-hand side of Figure 7.

Figure 9 is a fragmentary side elevational view illustrating novel driving means and associated connections of my improved dough-nut machine.

Figure 10 is a fragmentary side elevational view of a portion of my improved dough-nut machine, portions being illustrated in section and taken on line 10—10 of Figure 2.

Figure 11 is a fragmentary axial sectional view of my novel means for circulating the frying or cooking oil, and means for controlling the speed of the flow of said oil.

Figure 12 is a bottom plan view of my novel circulating and controlling means for the frying or cooking oil.

Figure 13 is a fragmentary longitudinal vertical sectional view of a portion of the spiral oil channel illustrating clockwise doughnut turning means therein, and further illustrating how the dough-nuts are submerged.

Figure 14 is a fragmentary view similar to Figure 13 illustrating anti-clockwise dough-nut turning means and also illustrating how the dough-nuts are lifted out of the frying oil.

Figure 15 is a fragmentary view illustrating my novel groove bearing for detachable disengagement of certain of the shafts of the conveyor when elevated.

Figure 16 is a sectional view taken on line 16—16 of Figure 17 illustrating my novel detachable clip for removal of portions of the spiral channel and also illustrating the means in the clip for locking engagement with the channel walls.

Figure 17 is a fragmentary vertical view of my novel clip in position on the spiral, portions being broken away.

Figure 18 is a perspective view of the clip per se.

Figure 19 is an elevational view of the conveyor angle arm.

Figure 20 is a fragmentary side elevational view of the permanent channel portions illustrating a flange on the ends upon which the detachable portions rest.

In the drawings forming a part of the specification, wherein like characters of reference designate corresponding parts throughout, the numeral 20 designates my novel dough-nut machine and it comprises a cylindrical base in which may be mounted any suitable heating unit (not shown). Superimposed upon the base 21 and detachable therefrom is a substantially cylindrical tank 22, having a flanged base 23 and a drain pipe 24, the tank 22 having an offset portion forming a housing 25, the housing extending above the tank. Within the inner confines of the tank 22 is a spiral 26 having substantially horizontal walls 27 that form a bottom 35. By this construction the spiral 26 and the bottom 35 forms a circuitous channel 29 for the flow of cooking or frying oil in the direction of the arrows therethrough, and divides the channel into a main portion 30 having side walls 31 and a shorter branch portion 32 having side walls 33.

From the point designated by the numeral 34 where the portions 30 and 32 of the channel separate, to the point designated by the numeral 98 where the channels again unite at the beginning of the channel as illustrated in Figure 5 of the drawings (i. e. adjacent an oil propeller that is to be later described) the bottom 35 of the main portion 30 is spaced above the bottom 36 of the branch portion 32, thus separating said portions, but before such separation and beyond such reuniting, the bottom of the channel as an entirety is at the level of the bottom 36 of the branch portion. A control gate 37 equipped with a plurality of apertures is detachably mounted in the channel where the channels separate at 34. This gate may be constructed of different size openings and serves as a medium in assisting in the control of the speed of the oil in the main frying channel 30. If it is desired to have the oil flow fast, a gate with small apertures is provided in the channel, allowing a small portion of the oil to be diverted, the greater portion of the oil going into the main frying channel 30, and when it is desired to have the oil flow slow through the frying channel 30 a gate with larger apertures is provided in the channel, allowing a greater portion of the oil to be diverted into the main frying channel. It is to be noted that before the separation and beyond the reuniting, the bottom of the channel as an entirety is at the level of the bottom 36 of the branch portion 32. On passing the end 38 of the bottom 35 of the main portion 30, the oil in said main portion falls to the bottom 39 (in Figure 5) of another portion 40 of the channel having walls 41, and flows therein to the beginning of the channel adjacent said oil propeller, the passage being under the spiral main portion 30 and in line with a conveyor to be later described.

The spiral is formed with detachable sections indicated by the numeral 42 for removal from the tank 22, the detachable sections permitting the cleaning of the lower channels 40 and 32, the channels being illustrated in Figure 5 of the drawings. In Figure 6 of the drawings, the numeral 43 represents an opening in the housing 25, the wall 44 of the detachable portion 42 serving as a closure means for the opening. The edges of the opening are beveled to conform to the beveled edges of the detachable closure, providing a leak proof closure.

The detachable sections 42 are held in engagement with the walls of the spiral 26 by U-shaped clips 45 of substantially arcuate configuration, having legs 46 and 47 with studs 48 that engage complemental detents in the side walls of the spiral 26.

The housing 25 extends above the tank 22 and it is provided with suitable mountings for the reception of operating mechanism which comprises a motor 49, pulley 50 on a motor shaft, a pulley 51 on a shaft 52, the pulleys having a driving belt 53 trained around them. The shaft 52 on one end has a gear 54 meshing with a gear 55 on a shaft 56. The shaft 56 on the opposite end is provided with a gear 57 that meshes with a gear 58 on the dough hopper, and on the opposite end of the shaft 52 is mounted a worm gear 59 housed in a housing 87, that meshes with a gear 95 to be explained later. The dough hopper and cutter 62 are of the type well known in the art and generally used in machines of the present type and therefore it does not form a part of the present invention and it is not shown in detail or described more particularly.

Mounted centrally of the tank 22 is a casting 63 having an arm 64 in which arm is mounted a shaft 65. At one end of the shaft 65 is mounted a gear 66 that meshes with and is driven by a gear 67 on the shaft of a sprocket wheel 68 whose teeth are engaged by a sprocket chain 69 forming a part of a belt conveyor 70. The shaft 65 at the opposite end is provided with a gear 71 that meshes with a gear 72, the shaft of which is mounted in a casting 73 in the tank 22. Also mounted on the shaft 65 is a rotatable means 74 having a plurality of radial arms 75 for a purpose to be later described.

The belt conveyor travels on a roller 77 on the shaft 56 and on idler rollers 78 and 79 mounted on shafts 80 and 81, the conveyor being driven and rotated by the roller 77 on the shaft 56, which shaft is rotated by associated mechanism through the medium of the motor 49. It is to be noted that the ends of the shaft 80 are housed in suitable bearings 82, having arcuate tracks 83, the tracks forming grooves 84 for free movement of the ends of the shaft 80 therein. If desired these tracks 83 may be integral with the inner walls of the housing 25. The ends of the shaft 81 are housed in similar bearings 82' having arcuate tracks 83', the tracks forming grooves 84' for free movement of the ends of the shaft 81 therein. If desired the tracks 83' may be integral with the wall of the spiral and the wall of the casting 63. By this construction I provide a means whereby the conveyor 70 may be elevated out of the tank 22, the shaft 56 acting as a fulcrum point for the conveyor to be swung in an elevated position. In order that the conveyor when elevated, will hold its operative shape, an angle arm or casting 86 illustrated in Figure 19 is provided and it is positioned as illustrated in Figure 6 in dotted lines.

In order that oil in the circuitous channel may be continuously circulated, I have provided novel means for such circulation, said means comprising a propeller and its associated mechanism as illustrated in Figures 10 and 11. The propeller mechanism is housed in a housing 87 that is a part of the housing 25. Within the housing 87 is mounted a shaft 88, and within the shaft is mounted a rod 89. On the end of the shaft is mounted a propeller 90 to which is secured one end of the rod 89. The rod 89 at its upper end is operatively connected to a screw threaded member 91, having a threaded shank 92 and a thumb head 93. The circulation, flow and speed of the oil is partly controlled by the propeller blades 94, the blades being so mounted that they may be varied as to inclination by turning them in their bearings on the shaft 88 by raising or lowering the rod 89 through the medium of the thumb head 93. Mounted on the shaft 88 is a gear 95 that meshes with the worm gear 59 on the shaft 52. The propeller is submerged in the oil at the beginning of the channel at 98, raises the oil and causes it to flow in the circuitous channel 29 in the direction of the arrows as illustrated in Figure 2.

In Figures 13 and 14 two forms of treating the dough-nuts after a portion of the dough-nuts have been partially cooked are illustrated, and in this showing, in Figure 13 the mechanism operates in a clock-wise manner and in Figure 14 in an anti-clock-wise manner. As illustrated in Figure 13, the arms 75 of the rotatable means 74 engage the dough-nuts 97 and depresses them into the oil during the turning over. In Figure 14 the rotatable means operates in an anti-clockwise manner, the arms 75 of the rotatable means engaging the dough-nuts 97, lifting them out of the hot oil, and upon reaching the air, the dough-nuts are somewhat cooled before being turned over and again placed in the hot oil.

It is to be noted that the course of the oil's flow in the upper spiral portion 30 is from the outer side of the channel's area towards the center of said area, the oil therein prevented from cooling by being brought continually nearer the center and more directly over the heating means (not shown), the dough-nuts being deposited in the channel near the edge of such area and to its center, where they are removed from the oil, are constantly and completely heated and cooked as they pass along through the oil, which due to my novel arrangement maintains a uniform temperature. By locating the operating devices as illustrated in the drawings, that is beyond the area occupied by the channel, they are kept cooler than if located above the center of such area.

In the operation of my novel dough-nut machine, the switch (not shown) to the motor is thrown to operative position, the motor 49 started and the mechanism of the dough-nut machine thrown into operation. The raw dough is placed in the hopper 62, where it is drawn down to a cutter housed in the hopper, and then passing through the cutter, the formed dough-nut drops and takes a dive into the deep channel, the depth of which is sufficient to prevent the dough-nut striking the bottom of the deep channel, this precaution being taken to prevent damage to the raw dough-nut. At the point where the dough-nut is formed and dropped, the speed of the propeller is so timed that the flow of the frying oil carries the dough-nut some distance so that the dough-nut does not come up at the point where it is dropped, and by this timing the dough-nuts are prevented from dropping on each other as they are ejected out of the dough hopper. The dough-nut from the point where it comes to the surface on the oil, starts on its cooking voyage on one side, and leaving the deep channel at the point of junction of the deep channel and main or shallow channel, enters the spiral 26 of the main frying channel 30 and travels in the direction of the arrows as indicated in Figure 2 of the drawings.

As stated, the frying tank is of greater depth where the raw dough-nuts are first dropped, the dough-nuts rising to the surface adjacent the dropping point. The separation of the oil of the main frying channel, that is at the point adjacent the point where the dough-nuts are dropped into the deep channel is a very important feature of the present invention, the novel arrangement providing a control means of the cooking oil. It is of the greatest importance that the speed of flow of the cooking oil be controlled, in order that the dough-nuts will have sufficient time to cook thoroughly during the circuitous voyage in the channel. By providing a gate opening at the junction of the deep section and main frying section, I provide a means for dividing the frying oil into two portions, one portion of the fat or cooking oil entering the main frying channel, and flowing therein to the end of the channel at the center of the tank and adjacent the conveyor. The other portion of the frying oil is diverted through the openings in the gate and into the under channel, and travels to a point near the base of the conveyor where the cooking oil from the main spiral rejoins the oil in the under channel into a single body, and as a single body of oil it is drawn through a continuation of the under channel back to the propeller, which, as explained, is the motivating unit that keeps the oil moving, the oil again entering the channel where the dough-nuts are first dropped, then to the point where the cooking oil is again divided. It can be readily seen that if provision were not made for controlling the cooking oil through the main spiral portion, the speed of the flow of the cooking oil would be too great for successful operation of the machine, the result being the dough-nuts would not be properly cooked.

By dividing the oil, the channel 30 being shallow, contains enough frying oil to float the dough-nuts. The dough-nuts float along through the spiral channel 29 inwardly until they reach the turnover member 74, the arms 75 of which engage the dough-nuts, and in Figure 13 the turnover member rotating in a clock-wise direction, the dough-nuts are submerged, turned over and ready to be fried on the other side. After the turnover, the dough-nuts continue on their frying voyage until they reach the slow moving conveyor 76, that picks them up and carries them to the top where they are deposited into a chute, and leaving the chute they enter a receiving receptacle.

In machines of the character described, there is a certain amount of dough crumbs that fall off of the dough-nuts during the cooking operation, and these crumbs in course of time deposit on the bottom of the channel and finally settle in the deep channel being carried through the main frying channel by the moving oil. In order that the deep channel may be cleaned, I have provided removable means as described, which means affords access to the deep channel and the short branch channel. When it is desired to clean the deep channel, the sprocket wheel 68 is removed from the shaft upon which it is mounted. The detachable clips 45 are next removed from the detachable sections 42 which are then lifted out of the tank 22. The conveyor is now raised to an elevated position and during the raising operation the conveyor shafts 80 and 81 travel in the grooves 84, the angle arm 86 holding the conveyor in its operative shape.

As previously stated, the flow of the frying oil is controlled by the propeller mechanism and due to the novel structure of same, the flow of the frying oil can be controlled as desired, the control being in the adjustment of the blades, the pitch of which may be changed instantly by turning the thumb head 92. Turning the thumb head in one direction increases the pitch of the blades which increases the flow of the oil, and by turning the thumb screw in the opposite direction decreases the pitch of the blades which decreases the flow of the oil.

I wish to have it understood, that if desired the present invention may be provided with an odorless hood (not shown).

While the principles of the invention will always be adhered to, the invention is susceptible to certain changes and modifications and I do not wish to limit myself to the exact structure, and changes may be made without departing from the spirit of the invention or the scope of the claims hereto appended, but:—

What I claim is:—

1. In mechanism of the character described, a circuitous cooking liquid channel comprising a flat spiral main portion, a connecting portion leading from one end of the main portion to the other end of the main portion, and a portion branching from the main portion and communicating at its ends with the main portion, detachable portions in the main spiral portion, means for circulating the cooking liquid in the channel toward the inner end of the main portion, and thence through the connecting portion to the outer end of the main portion, and also through the branching portion.

2. In mechanism of the character described, a circuitous cooking liquid channel comprising a flat spiral main portion, a connecting portion leading from one end of the main portion to the other end of the main portion and having its bottom at a level different from that of the main portion, a portion branching from the main portion and communicating at its ends with the main portion and having its bottom at a level different from that of the main portion, detachable portions in the main spiral portion, means for circulating the cooking liquid in the channel towards the inner end of the main portion and thence through the connecting portion to the outer end of the main portion and also through the branching portion.

3. In mechanism of the character described, a circuitous cooking liquid channel comprising a flat spiral main portion, a connecting portion leading from one end of the main portion to the other end of the main portion, and a portion branching from the main portion and communicating at its ends with the main portion, detachable portions in the main spiral portion, means for holding the detachable portions in locked engagement with the main portion, means for circulating the cooking liquid in the channel toward the inner end of the main portion and thence through the connecting portion to the outer end of the main portion, and also through the branching portion, means for lifting the work from the cooking liquid adjacent the inner end of the main portion.

4. In mechanism of the character described, a circuitous cooking liquid channel comprising a flat spiral main portion, a connecting portion leading from one end of the main portion to the other end of the main portion and having its bottom at a level different from that of the main portion, and a portion branching from the main portion and communicating at its ends with the main portion, and having its bottom at a level different from that of the main portion, detachable portions in the main spiral portion, means for holding the detachable portions in locked engagement with the main portion, means for circulating the cooking liquid in the channel toward the inner end of the main portion and thence through the connecting portion to the center of the main portion and also through the branching portion, means for lifting the work from the cooking liquid in the connecting portion adjacent the inner end of the main portion.

5. In mechanism of the character described, a circuitous cooking liquid channel comprising a flat spiral main portion, a connecting portion from one end of the main portion to the other end of the main portion and having its bottom at a level from that of the main portion, and a portion branching from the main portion and communicating at its ends with the main portion, and having its bottom at a level different from that of the main portion, detachable portions in the main spiral portion, means for holding the detachable portions in locked engagement with the main portions, means for circulating the cooking liquid in the channel toward the inner end of the main portion and thence through the connecting portion to the outer end of the main portion and also through the branching portion, means for lifting the work from the cooking liquid in the connecting portion adjacent the inner end of the main portion, said work lifting means adapted for engagement with and disengagement from said cooking liquid.

6. In mechanism of the character described, a circuitous cooking liquid channel comprising a flat spiral main portion, a connecting portion leading from one end of the main portion to the other end of the main portion and having its bottom at a level different from that of the main portion, and a portion branching from the main portion and communicating at its end with the main portion, and having its bottom at a level different from that of the main portion, detachable portions in the main spiral portion, means for holding the detachable portions in locked engagement with the main portions, means for circulating the cooking liquid in the channel toward the inner end of the main portion and thence through the connecting portion to the outer end of the main portion and also through the branching portion, means for lifting the work from the cooking liquid in the connecting portion adjacent the inner end of the main portion, said work lifting means adapted for engagement with and disengagement from said main portion adjacent the inner ends thereof and means for holding the work lifting means in operative shape when disengaged from said main portion adjacent the inner ends thereof.

7. In mechanism of the character described, a circuitous cooking liquid channel comprising a flat spiral main portion, a connecting portion leading from one end of the main portion to the other end of the main portion and having its bottom at a level different from that of the main portion, and a portion branching from the main portion and communicating at its ends with the main portion, and having its bottom at a level different from that of the main portion, detachable portions in the main spiral portion, means for holding the detachable portions in locked engagement with the main portions, means for circulating the cooking liquid in the channel toward the inner end of the main portion and thence through the connecting portion to the outer end of the main portion and also through the branching portion, the liquid circulating means equipped with adjustable means for regulating the flow of the cooking liquid, means for lifting the work from the cooking liquid in the connecting portion adjacent the inner end of the main portion, said work lifting means adapted for engagement with and disengagement from said main portion adjacent the inner ends thereof and means for holding the work lifting means in operative shape when disengaged from said main portion adjacent the inner ends thereof.

8. In mechanism of the character described, a circuitous cooking liquid channel comprising a flat spiral main portion, a connecting portion leading from one end of the main portion to the other end of the main portion and having its bottom at a level different from that of the main portion and a portion branching from the main portion and communicating at its end with the main portion and having its bottom at a level different from that of the main spiral portion, means for holding the detachable portions in locked engagement with the main portions, means for circulating the cooking liquid in the channel toward the inner end of the main portion and thence through the connecting portion to the outer end of the main portion and also through the branching portion, the liquid circulating means equipped with adjustable means for regulating the flow of the cooking liquid, means at the entrance of the main channel and branch channel for separating the cooking liquid, means for lifting the work from the cooking liquid in the connecting portion adjacent the inner end of the main portion, said work lifting means adapted for engagement with and disengagement from said main portion adjacent the inner ends thereof and means for holding the work lifting means in operative shape when disengaged from said portion adjacent the inner ends thereof.

9. In a dough-nut machine comprising a base, a tank superimposed upon said base, of a spiral portion in said base, of detachable portions in said spiral, means for holding the detachable portions in operative position in the spiral, and a conveyor adapted for operative engagement with and disengagement from said tank.

10. In a dough-nut machine comprising a base, a tank superimposed upon said base, a spiral portion in said base, detachable portions in said spiral, means for holding the detachable portions in operative position in the spiral, work turning means in the spiral and a conveyor adapted for operative engagement with and disengagement from said tank.

11. In a dough-nut machine comprising a base, a tank superimposed upon said base, a spiral portion in said base, detachable portions in said spiral, of means for holding the detachable portions in operative position in the spiral, work turning means in the spiral, means for circulating a cooking liquid in said tank and a conveyor adapted for operative engagement with and disengagement from said tank.

12. In a dough-nut machine comprising a base, a tank superimposed upon said base, a spiral portion in said base, detachable portions in said spiral, means for holding the detachable portions in operative position in the spiral, work turning means in the spiral, means for circulating a cooking liquid in said tank, a conveyor adapted for operative engagement with and disengagement from said tank, and means on said conveyor for holding the conveyor in operative shape when disengaged from the tank.

13. In a dough-nut machine comprising a base, a tank superimposed upon said base, a circuitous cooking liquid channel in said tank comprising a main portion and a branch portion, and having its bottom at a level different from that of the main portion, said main portion having detachable portions therein, means for holding said detachable portions in communication with said liquid channel and means at one end of the branch portion for moving the liquid from one of said portions into the other of said portions.

14. In a dough-nut machine comprising a base, a tank superimposed upon said base, a circuitous cooking liquid channel in said tank comprising a main portion and a branch portion, and having its bottom at a level different from that of the main portion, said main portion having detachable portions therein, means for holding said detachable portions in communication with said liquid channel, means for circulating the cooking liquid in the channels, said circulating means equipped with adjustable means for regulating the flow of the cooking liquid.

15. In a dough-nut machine comprising a base, a tank superimposed upon said base, a circuitous cooking liquid channel in said tank comprising a main portion and a branch portion, and having its bottom at a level different from that of the main portion, said main portion having detachable portions therein, means for holding said detachable portions in communication with said liquid channels, circulating means equipped with adjustable means for regulating the flow of cooking liquid and means at the entrance of the main channel and branch channel for separating the cooking liquid.

16. In a dough-nut machine comprising a base, a tank superimposed upon said base, a circuitous cooking liquid channel in said tank comprising a main portion and a branch portion and having its bottom at a level different from that of the main portion, said main portion having detachable portions therein, means for holding said detachable portions in communication with said liquid channels, circulating means equipped with adjustable means for regulating the flow of the cooking liquid, means at the entrance of the main channel and the branch channel for separating the cooking liquid and means for lifting the work from the cooking liquid.

17. In a dough-nut machine comprising a base, a tank superimposed upon said base, a circuitous cooking liquid channel in said tank comprising a main portion and a branch portion and having its bottom at a level different from that of the main portion, said main portion having detachable portions therein, means for holding said detachable portions in communication with said liquid channels, circulating means equipped with adjustable means for regulating the flow of the cooking liquid, means at the entrance of the main channel and the branch channel for separating the cooking liquid, means for lifting the work from the cooking liquid equipped with means for holding the work lifting means in operative shape when disengaged from the tank.

JOHN A. MORAN.